(12) United States Patent
Kitazawa

(10) Patent No.: US 9,081,993 B2
(45) Date of Patent: Jul. 14, 2015

(54) CARD READER AND CONTROL METHOD THEREFOR

(71) Applicant: NIDEC SANKYO CORPORATION, Nagano (JP)

(72) Inventor: Yasuhiro Kitazawa, Nagano (JP)

(73) Assignee: NIDEC SANKYO CORPORATION (JP)

( * ) Notice: Subject to any disclaimer, the term of this patent is extended or adjusted under 35 U.S.C. 154(b) by 0 days.

(21) Appl. No.: 13/934,595

(22) Filed: Jul. 3, 2013

(65) Prior Publication Data

US 2014/0008438 A1    Jan. 9, 2014

(30) Foreign Application Priority Data

Jul. 5, 2012  (JP) ................. 2012-151268

(51) Int. Cl.
*G06K 7/08*  (2006.01)
*G06K 7/00*  (2006.01)
*G06K 13/08* (2006.01)
*G06K 13/26* (2006.01)
*G06K 19/00* (2006.01)

(52) U.S. Cl.
CPC *G06K 7/00* (2013.01); *G06K 7/082* (2013.01); *G06K 7/084* (2013.01); *G06K 13/08* (2013.01); *G06K 13/26* (2013.01); *G06K 19/005* (2013.01)

(58) Field of Classification Search
CPC ........ G06K 7/00; G06K 13/26; G06K 19/005
USPC ....................................... 235/449
See application file for complete search history.

(56) References Cited

U.S. PATENT DOCUMENTS 7,175,085 B2 *  2/2007  Oguchi .................. 235/451
7,441,702 B2 * 10/2008  Tadamasa ............... 235/449

FOREIGN PATENT DOCUMENTS

| JP | 3806271 B2 | 5/2006 |
| JP | 4464021 B2 | 2/2010 |
| WO | 01/01337 A1 | 1/2001 |

OTHER PUBLICATIONS

Machine translation of JP 3806271 B2. Translation received Jun. 1, 2014. Published Aug. 2006.*

* cited by examiner

*Primary Examiner* — Steven S Paik
*Assistant Examiner* — Asifa Habib
(74) *Attorney, Agent, or Firm* — Cantor Colburn LLP

(57) ABSTRACT

A card reader includes a taking-out detection mechanism for detecting taking-out of a card from a taking-out ready state, which is a state that a part of the card is protruded from the card insertion-and-ejection port to an outer side of the card reader so that the card is capable of being taken out from the card reader, and a resistance applying mechanism structured to abut with the card taken out from the card reader to apply a frictional resistance to the card so as to disturb taking-out of the card. The resistance applying mechanism may include a feed roller configured to feed the card in a direction ejecting the card from an inside of the card reader until the taking-out ready state and, when start of taking-out of the card from the taking-out ready state is detected by the taking-out detection mechanism, the feed roller may be temporarily rotated in a direction taking the card into the card reader.

7 Claims, 2 Drawing Sheets

CARD READER AND CONTROL METHOD THEREFOR

Priority under 35 U.S.C. §119(a) is claimed from Japanese Application No. 2012-151268, filed Jul. 5, 2012, the disclosure of which is also incorporated herein by reference.

FIELD OF THE INVENTION

The present invention relates to a card reader which is structured to read magnetic data recorded on a card and/or record magnetic data on a card. Further, the present invention relates to a control method for the card reader.

BACKGROUND OF THE INVENTION

Conventionally, a card reader structured to read magnetic data on a card and/or record magnetic data on a card has been widely utilized. The card reader is, for example, mounted on an automatic teller machine which is installed in a financial institution or the like. In the financial institutions in which the card reader is utilized, a so-called "skimming" has been conventionally a serious problem. In skimming, a criminal attaches a magnetic head to an inserting portion for a card of an automatic teller machine to illegally acquire magnetic data of a card by using the magnetic head. In order to prevent the problem, a card reader provided with a structure for preventing illegal acquisition of magnetic data through a magnetic head for skimming (hereinafter, referred to as a "skimming magnetic head") has been proposed (see, for example, Japanese Patent No. 3806271).

The card reader described in the above-mentioned Patent Literature is provided with a pair of take-in rollers for taking a card into the card reader and for ejecting the card from an inside of the card reader. In the card reader, a pair of the take-in rollers is stopped or reversed in the middle of taking a card into the card reader by a pair of the take-in rollers and in the middle of ejecting the card from the inside of the card reader by the take-in rollers. Therefore, in the card reader, a feeding speed of a card is largely varied at the time of a taking-in operation of a card and an ejecting operation of the card. Accordingly, in the card reader, even when a skimming magnetic head is attached to an insertion portion for a card, it is difficult that significant magnetic data are acquired by using the skimming magnetic head at the time of a taking-in operation of a card and an ejecting operation of the card. In other words, in the card reader, the skimming at the time of a taking-in operation of a card and an ejecting operation of the card can be prevented.

In the card reader described in the above-mentioned Patent Literature, when an ejecting operation of a card by a pair of the take-in rollers has finished, a tip end side of a card protrudes from a card slot (insertion-and-ejection port for a card) to the outside of the card reader in a state that a rear end side of the card is sandwiched by the take-in rollers. In other words, in the card reader, when an ejecting operation of a card by a pair of the take-in rollers has finished, a tip end side of the card protruded to the outside of the card reader is capable of being held by a user so that the user can take out the card from the card reader and, when the card has been taken out from the card reader, processing of a card in the card reader is completed.

As described above, in the card reader described in the above-mentioned Patent Literature, even when a skimming magnetic head is attached to an inserting portion for a card, skimming at the time of a taking-in operation of a card and an ejecting operation of a card can be prevented. However, in the card reader, when a skimming magnetic head is attached to an inserting portion for a card, skimming at the time of taking-out of a card by a user cannot be prevented.

SUMMARY OF THE INVENTION

In view of the problem described above, at least an embodiment of the present invention may provide a card reader which is capable of preventing skimming when a card is taken out from the card reader by a user. Further, at least an embodiment the present invention may also provide a control method for a card reader which is capable of preventing skimming when a card is taken out from the card reader by a user.

To achieve the above, the present invention may provide a card reader which is structured to perform at least one of reading of magnetic data recorded on a card and recording of magnetic data on a card. The card reader includes a card insertion-and-ejection part which is formed with a card insertion-and-ejection port into which a card is inserted and from which the card is ejected, a taking-out detection mechanism for detecting taking-out of the card from a taking-out ready state, which is a state that a part of the card is protruded from the card insertion-and-ejection port to an outer side of the card reader, or that a part of the card is exposed in the card insertion-and-ejection part so that the card is capable of being taken out from the card reader, and a resistance applying mechanism which is structured to abut with the card taken out from the card reader to apply a frictional resistance to the card so as to disturb taking-out of the card. The resistance applying mechanism applies a frictional resistance to the card so as to disturb taking-out of the card when start of taking-out of the card from the taking-out ready state is detected by the taking-out detection mechanism.

The card reader in at least an embodiment of the present invention may include a taking-out detection mechanism for detecting taking-out of the card from a taking-out ready state, and a resistance applying mechanism which is structured to abut with the card taken out from the card reader to apply a frictional resistance to the card so as to disturb taking-out of the card. Further, in at least an embodiment of present invention, when start of taking-out of the card from the taking-out ready state is detected by the taking-out detection mechanism, the resistance applying mechanism applies a frictional resistance to the card so as to disturb taking-out of the card. Therefore, in at least an embodiment of the present invention, the taking-out speed of the card is made non-uniform by the frictional resistance which is applied by the resistance applying mechanism at the time of taking-out of the card by a user. For example, the taking-out speed of a card can be made non-uniform from the time when a user applies a taking-out force to the card in the taking-out ready state until the card is taken out from the card insertion-and-ejection port by the user. Accordingly, in at least an embodiment of the present invention, even when a skimming magnetic head is attached to a front side of the card insertion-and-ejection part or the like, significant magnetic data are prevented from being acquired by the skimming magnetic head at the time of taking-out of the card by a user. As a result, skimming is prevented at the time of taking-out of the card from the card reader by a user.

In at least an embodiment of the present invention, it is preferable that the resistance applying mechanism includes a feed roller configured to feed the card in a direction ejecting the card from an inside of the card reader until the taking-out ready state and, when start of taking-out of the card from the taking-out ready state is detected by the taking-out detection mechanism, the feed roller is rotated in a direction taking the card into the card reader. According to this structure, a frictional resistance is applied to the card so as to disturb taking-out of the card by utilizing the feed roller for feeding the card. In other words, according to this structure, another mechanism is not required to provide separately for applying a frictional resistance to a card so as to disturb taking-out of the card and the frictional resistance is applied to the card so as to disturb taking-out of the card only by modifying the control method for the card reader. Accordingly, the structure of the card reader is simplified.

In at least an embodiment of the present invention, it may be structured that the resistance applying mechanism includes an abutting member configured to abut with at least one of an end face of the card in a direction perpendicular to a taking-out direction of the card and a surface of the card, and a moving mechanism which moves the abutting member between an abutting position where the abutting member is capable of abutting with the card and a retreated position where the abutting member does not abut with the card and, when start of taking-out of the card from the taking-out ready state is detected by the taking-out detection mechanism, the moving mechanism moves the abutting member located at the retreated position to the abutting position. In this case, for example, even in a manual type card reader in which reading and/or recording of magnetic data are performed while a user manually moves the card (in other words, even in a case that a card reader is not provided with a mechanism for moving a card), a frictional resistance is applied to the card so as to disturb taking-out of the card by abutting the abutting member with the card. In other words, a taking-out speed of a card at the time of taking-out of the card by a user is made non-uniform by a simple structure in which the abutting member is moved to the abutting position and, as a result, skimming is prevented.

In at least an embodiment of the present invention, it is preferable that the taking-out detection mechanism includes a magnetic head which is disposed in the card insertion-and-ejection part. According to this structure, it can be detected whether magnetic data are recorded on a card inserted from a card insertion-and-ejection port or not by using the magnetic head which is used as the taking-out detection mechanism for detecting taking-out of a card.

Further, to achieve the above, at least an embodiment of the present invention provides a control method for a card reader which includes a card insertion-and-ejection part formed with a card insertion-and-ejection port into which a card is inserted and from which the card is ejected and in which at least one of reading of magnetic data recorded on the card and recording of magnetic data on a card is performed. In the control method, when start of taking-out of the card from a taking-out ready state, which is a state that a part of the card is protruded from the card insertion-and-ejection port to an outer side of the card reader or a part of the card is exposed in the card insertion-and-ejection part, is detected, a frictional resistance is applied to the card by a resistance applying mechanism which is abutted with the card taken out from the card reader and applies the frictional resistance to the card so as to disturb taking-out of the card.

In the control method for a card reader in accordance with at least an embodiment of the present invention, when start of taking-out of the card from a taking-out ready state which is a state that the card is capable of being taken out from the card reader is detected, a frictional resistance is applied to the card by a resistance applying mechanism which is abutted with the card taken out from the card reader and applies the frictional resistance to the card so as to disturb taking-out of the card. Therefore, in at least an embodiment of the present invention, the taking-out speed of the card is made non-uniform by the frictional resistance applied by the resistance applying mechanism at the time of taking-out of the card by a user. Accordingly, in at least an embodiment of the present invention, even when a skimming magnetic head is attached to a front side of the card insertion-and-ejection part or the like, significant magnetic data are prevented from being acquired by the skimming magnetic head at the time of taking-out of the card by a user. As a result, skimming at the time of taking-out of the card from the card reader by a user is prevented.

It is preferable that the control method for a card reader in accordance with at least an embodiment of the present invention includes a taking-out start detection step in which it is detected whether taking-out of the card from the taking-out ready state is started or not, a resistance apply start step in which the resistance applying mechanism starts to apply the frictional resistance to the card when it is detected that taking-out of the card is started in the taking-out start detection step, and a resistance reduction step in which, when the card is not taken out from the card reader within a predetermined time period after the resistance apply start step, application of the frictional resistance to the card by the resistance applying mechanism is stopped or the frictional resistance to the card by the resistance applying mechanism is reduced and, after the resistance reduction step, the taking-out start detection step is executed. According to this structure, when a predetermined time period is passed after the resistance apply start step, a taking-out force for the card required to take out the card by a user is temporarily reduced. Therefore, the card is set in a state that the card is easily taken out by a user. Further, since a taking-out force required to take out the card by a user is temporarily reduced, in a case that the user takes out the card with a constant force, a taking-out speed of the card is easily made non-uniform at the time of taking-out of the card by the user.

In at least an embodiment of the present invention, it is preferable that the resistance applying mechanism includes a feed roller configured to feed the card in a direction ejecting the card from an inside of the card reader until the taking-out ready state and, in the resistance apply start step, the feed roller is started to rotate in a direction taking the card into the card reader. According to this structure, even when another mechanism is not provided separately for applying a frictional resistance to a card so as to disturb taking-out of the card, the frictional resistance is applied to the card so as to disturb taking-out of the card only by modifying the control method for the card reader and by utilizing the feed roller for feeding the card. Therefore, the structure of the card reader is simplified.

It is preferable that the control method for a card reader in accordance with at least an embodiment of the present invention includes a taking-in detection step in which it is detected whether the card is taken into the card reader or not after the resistance apply start step, and a card ejection step in which, when it is detected that the card is taken into the card reader in the taking-in detection step, the feed roller is rotated in an ejecting direction of the card so that an ejecting operation of the card is performed until the taking-out ready state and, after the card ejection step, the taking-out start detection step is executed. According to this structure, even when the feed roller is rotated in a direction taking the card into the card reader for applying a frictional resistance to the card which is going to be taken out, a holding allowance of the front end side of the card when the card is taken out can be secured. Further, according to this structure, the card which is going to be taken out from the card reader by a user is prevented from being taken into the inside of the card reader.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which: FIG. 1(A) is a side view showing a taking-out ready state that a card is capable of being taken out from the card reader by a user, and FIG. 1(B) is a side view showing a state that a card is detected by a card sensor.

DETAILED DESCRIPTION OF THE PREFERRED EMBODIMENTS

An embodiment of the present invention will be described below with reference to the accompanying drawings.

(Structure of Card Reader)

Figure 1A:
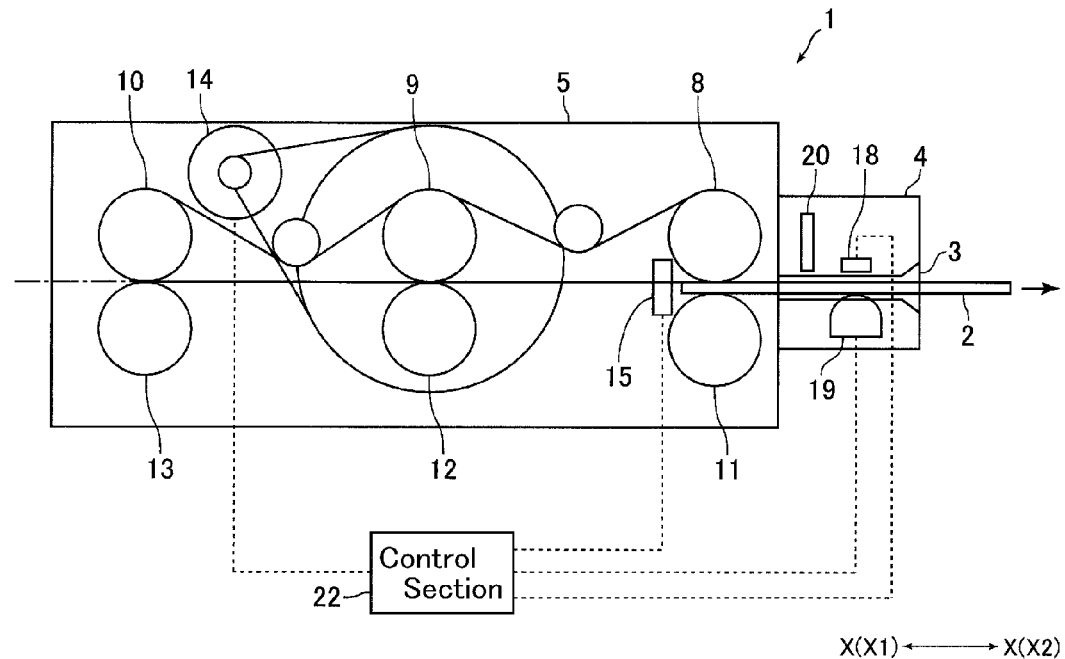
FIGS. 1(A) and 1(B) are explanatory side views showing a schematic structure of a card reader in accordance with an embodiment of the present invention.
Figure 1B:
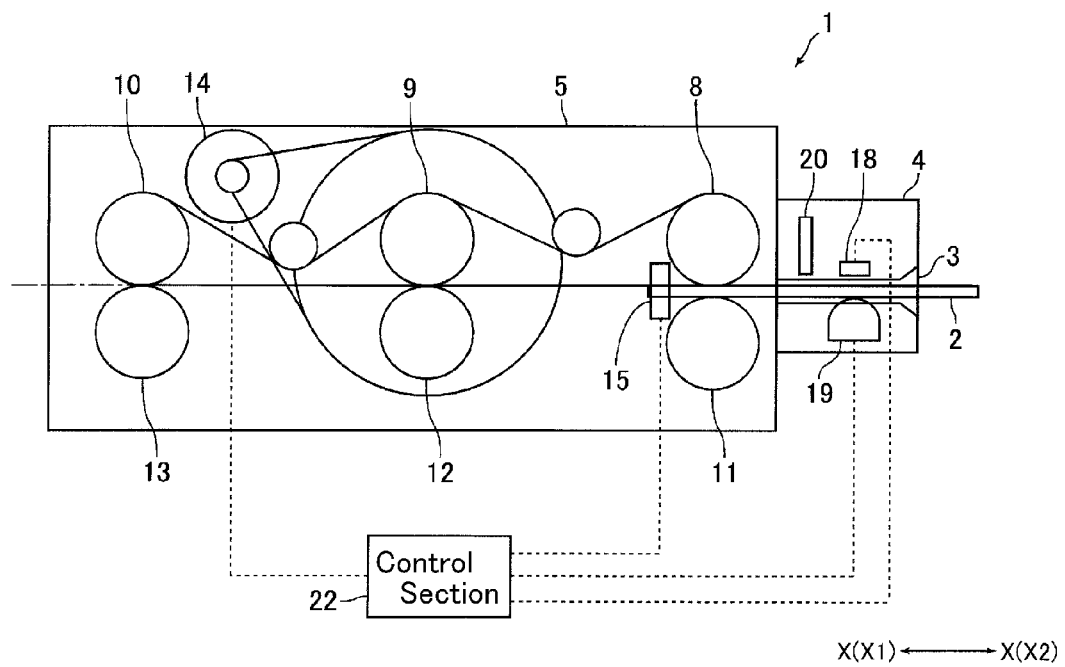

FIGS. 1(A) and 1(B) are explanatory side views showing a schematic structure of a card reader 1 in accordance with an embodiment of the present invention. FIG. 1(A) is a side view showing a taking-out ready state that a card 2 is capable of being taken out from the card reader 1 by a user, and FIG. 1(B) is a side view showing a state that a card 2 is detected by a card sensor 15.

A card reader 1 in this embodiment is a device which is structured to perform reading of magnetic data recorded on a card 2 and/or recording of magnetic data on a card 2. The card reader 1 is mounted and used in a predetermined host apparatus such as an ATM (Automated Teller Machine). The card reader 1 includes, as shown in FIGS. 1(A) and 1(B), a card insertion-and-ejection part 4 in which a card insertion-and-ejection port 3 into which a card 2 is inserted and form which the card is ejected is formed, and a main body part 5 in which a magnetic head (not shown) for performing reading of magnetic data and/or recording of magnetic data is disposed in its inside. A card feeding passage along which a card 2 is fed is formed in the card insertion-and-ejection part 4 and the inside of the main body part 5.

In this embodiment, a card 2 is fed in an "X" direction in FIGS. 1(A) and 1(B). In other words, the "X" direction is a feeding direction of a card 2. Further, in this embodiment, a card 2 is inserted in an "X1" direction in FIGS. 1(A) and 1(B) and the card 2 is ejected in an "X2" direction. In other words, the "X1" direction is an inserting direction of a card 2, and the "X2" direction is an ejecting direction of the card 2. Further, the "X2" direction is a taking-out direction of a card 2 from the card reader 1. In the following descriptions, the "X1" direction side is referred to as a "back (rear)" side and the "X2" direction side is referred to as a "front" side.

A card 2 is, for example, a rectangular card made of vinyl chloride whose thickness is about 0.7-0.8 mm. A magnetic stripe in which magnetic data are recorded is formed on a rear face of the card 2. An IC chip and an antenna for communication may be incorporated into an inside of a card 2. Further, the card 2 may be a PET (polyethylene terephthalate) card whose thickness is about 0.18-0.36 mm or may be a paper card having a predetermined thickness. Other various cards are suitable also for use with present card reader.

Drive rollers 8 through 10 and pad rollers 11 through 13 for feeding a card 2 are disposed in an inside of the main body part 5 in addition to the magnetic head. The magnetic head is disposed so that its gap part faces the card feeding passage from a lower side. The drive rollers 8 through 10 are disposed so as to face the card feeding passage from an upper side. The drive rollers 8 through 10 are disposed at predetermined intervals in a front and rear direction. Further, the drive rollers 8 through 10 are disposed from the front side of the main body part 5 to the back side in this order. Each of the pad rollers 11 through 13 is oppositely disposed to each of the drive rollers 8 through 10 from a lower side and is urged toward each of the drive rollers 8 through 10.

A motor 14 is connected with the drive rollers 8 through 10 through a power transmission mechanism such as a belt and a pulley. The drive rollers 8 through 10 are rotatable in a clockwise direction and a counterclockwise direction by power of the motor 14. A card sensor 15 for detecting a card 2 is disposed on an immediately back side with respect to the drive roller 8 and the pad roller 11. The card sensor 15 is, for example, an optical type sensor provided with a light emitting element and a light receiving element which are disposed so as to interpose the card feeding passage. A card 2 is detected when light from the light emitting element to the light receiving element is intercepted by the card 2.

The card insertion-and-ejection part 4 is attached to a front face of the main body part 5. An insertion detection mechanism 18 for detecting that a card 2 is inserted into the card insertion-and-ejection part 4, a magnetic head (pre-head) 19 for detecting that magnetic data are recorded on the card 2 inserted from the card insertion-and-ejection port 3, and a shutter member 20 for closing the card feeding passage are disposed on an inner side of the card insertion-and-ejection part 4. The pre-head 19 is disposed so that its gap part faces the card feeding passage from a lower side.

The insertion detection mechanism 18 is a width detection mechanism by which an end part of a card 2 in a widthwise direction of the card 2 perpendicular to the feeding direction of the card 2 is detected and thereby it is detected that a card 2 is inserted into the card insertion-and-ejection part 4. For example, the insertion detection mechanism 18 includes a lever member which is abutted with an end face in a widthwise direction of a card 2 to be displaced, and a width detection sensor which detects displacement of the lever member. The width detection sensor is, for example, an optical type sensor provided with a light emitting element and a light receiving element. The lever member is provided with a card abutting part with which an end face in a widthwise direction of a card 2 is abutted and a light intercepting part which intercepts between the light emitting element and the light receiving element of the width detection sensor.

When a card 2 is not inserted into the card insertion-and-ejection part 4, the light intercepting part of the lever member intercepts between the light emitting element and the light receiving element of the width detection sensor. On the other hand, when a card 2 having a card width in compliance with a predetermined standard is inserted into the card insertion-and-ejection part 4, an end face in the widthwise direction of the card 2 is abutted with the card abutting part and thus the light intercepting part is moved from a position between the light emitting element and the light receiving element of the width detection sensor and it is detected that the card 2 is inserted into the card inserting/ejecting part 4. In accordance with an embodiment of the present invention, the insertion detection mechanism 18 may be an optical type sensor provided with a light emitting element and a light receiving element which are disposed so as to interpose the card feeding passage, or may be a micro switch provided with a lever member, which is to be abutted with a card 2, and a contact switch.

A shutter member 20 is disposed on a back side with respect to the insertion detection mechanism 18 and the pre-head 19. The shutter member 20 is connected with a shutter drive mechanism (not shown) having a drive source such as a solenoid and the shutter member 20 is movable between a closing position which closes the card feeding passage and an open position which opens the card feeding passage by power of the drive source. In this embodiment, in a waiting state before a card 2 is inserted into the card insertion-and-ejection part 4, the shutter member 20 is located at the closing position and closes the card feeding passage. On the other hand, when a card 2 is inserted into the card insertion-and-ejection port 3 and the insertion detection mechanism 18 detects that a card 2 has been inserted and the pre-head 19 detects that magnetic data are recorded on the card 2, the shutter member 20 is moved from the closing position to the open position and the card feeding passage is opened.

The motor 14, the card sensor 15, the insertion detection mechanism 18 and the pre-head 19 are electrically connected with a control section 22 which controls the card reader 1. The drive source for the shutter member 20 is also connected with the control section 22.

In this embodiment, when reading of magnetic data of a card 2 taken into the inside of the card reader 1 and/or recording of magnetic data to a card 2 are finished, the card 2 is fed to the front side and ejected by the drive rollers 8 through 10 and the pad rollers 11 through 13. An ejecting operation of a card 2 by the drive rollers 8 through 10 and the pad rollers 11 through 13 is completed when the rear end of the card 2 which is fed to the front side has passed through the card sensor 15.

When the ejecting operation of a card 2 is completed, as shown in FIG. 1(A), the rear end side of the card 2 is sandwiched between the drive roller 8 and the pad roller 11. Further, in this case, the front end side of the card 2 is protruded from the card insertion-and-ejection port 3 to the outside (specifically, front side) of the card reader 1, and a user is capable of holding the front end portion of the card 2 and taking out the card 2 from the card reader 1. In other words, when the ejecting operation of a card 2 is completed, the card 2 is set in a taking-out ready state in which the card 2 is capable of being taken out from the card reader 1 by a user. In the taking-out ready state in which the card 2 is capable of being taken out, the pre-head 19 is contacted with the magnetic stripe of the card 2 and the card 2 is detected by the insertion detection mechanism 18.

Next, an example of an operation of the card reader 1 when a user takes out a card 2 in the taking-out ready state will be described below.

(Operation of Card Reader at the Time of Taking-Out of Card)

Figure 2:
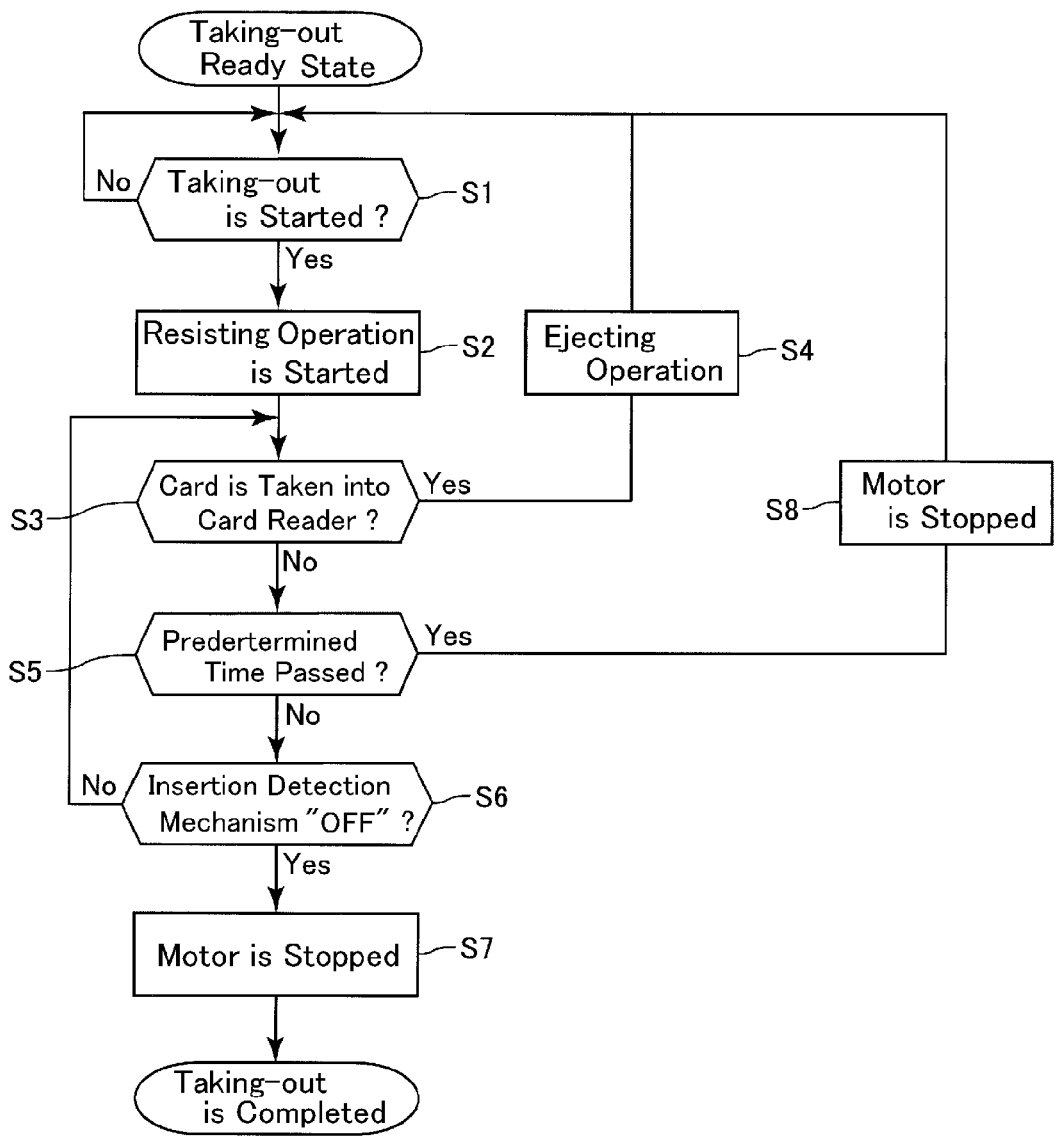
FIG. 2 is a flow chart showing an example of an operation of the card reader shown in FIGS. 1(A) and 1(B) when a user takes out a card in a taking-out ready state that the card is capable of being taken out.

FIG. 2 is a flow chart showing an example of an operation of the card reader 1 shown in FIGS. 1(A) and 1(B) when a user takes out a card 2 in a taking-out ready state that the card 2 is capable of being taken out.

An ejecting operation of a card 2 by the drive rollers 8 through 10 and the pad rollers 11 through 13 is completed and, when the card is set in a taking-out ready state that the card 2 is capable of being taken out, first, the control section 22 judges whether a taking-out operation of the card 2 by a user is started or not (step S1). As described above, in the taking-out ready state in which a card 2 is capable of being taken out, the pre-head 19 is contacted with the magnetic stripe of the card 2 and thus, in the step "S1", the control section 22 judges whether a taking-out operation of the card 2 by a user is started or not on the basis of whether magnetic data are detected by the pre-head 19 or not. In other words, the pre-head 19 detects whether a taking-out operation of a card 2 is started or not.

When it is detected by the pre-head 19 that a taking-out operation of a card 2 is started from the taking-out ready state ("Yes" in step S1), the control section 22 starts a resisting operation in which a frictional resistance is applied to the card 2 so as to disturb the taking-out operation of the card 2 (step S2). Specifically, in the step "S2", the control section 22 drives the motor 14 so that the drive roller 8 abutting with the rear end side of the card 2 is rotated in a direction taking the card 2 into the card reader 1 (in other words, so as to rotate the drive roller 8 in a clockwise direction in FIGS. 1(A) and 1(B) and the control section 22 starts to apply a frictional resistance to the card 2 so as to disturb the taking-out operation of the card 2.

After that, the control section 22 judges whether the card 2 is taken into the card reader 1 or not (step S3). Specifically, in the step "S3", the control section 22 judges whether the rear end side of the card 2 is detected by the card sensor 15 or not. At the time of taking-out of the card 2 by a user, when the card 2 is taken into the back side by the drive roller 8 rotating in the clockwise direction until the rear end side of the card 2 is detected by the card sensor 15, as shown in FIG. 1(B), a holding allowance on the front end side of the card 2 is reduced and thus the card 2 is hard to be taken out by the user.

Therefore, in the step "S3", when the rear end side of the card 2 is detected by the card sensor 15 ("Yes" in step S3), the control section 22 drives the motor 14 so that the drive roller 8 is rotated in the direction ejecting the card 2 from the inside of the card reader 1 (in other words, the drive roller 8 is rotated in the counterclockwise direction in FIGS. 1(A) and 1(B)) to perform an ejecting operation of the card 2 (step S4). Specifically, in the step "S4", the card 2 is ejected until the rear end of the card 2 fed to the front side by the drive roller 8 which is rotated in the counterclockwise direction is passed through the card sensor 15 (in other words, until the taking-out ready state is set). In the step "S4", when the ejecting operation of the card 2 has finished, the flow is returned to the step "S1" and it is judged again whether an taking-out operation of the card 2 is started or not.

On the other hand, in the step "S3", in a case that the rear end side of the card 2 is not detected by the card sensor 15 ("No" in step S3), the control section 22 judges whether or not a predetermined time period has passed after the resisting operation is started (step S5). In the step "S5", in a case that the predetermined time period has not passed ("No" in step S5), the control section 22 judges whether the insertion detection mechanism 18 does not detect the card 2 or not (step S6). In other words, the control section 22 judges whether or not the rear end side of the card 2 which is taken out has been passed through the insertion detection mechanism 18 and the taking-out operation of the card 2 is completed.

In the step "S6", when the insertion detection mechanism 18 does not detect the card 2 ("Yes" in step S6), the control section 22 stops the motor 14 (step S7). When the motor 14 is stopped in the step "S7", the taking-out operation of the card 2 is completed. On the other hand, in the step "S6", in a case that the insertion detection mechanism 18 detects the card 2 ("No" in the step S6), the flow is returned to the step "S3" and the control section 22 continues the resisting operation.

Further, in the step "S5", in a case that the predetermined time period has passed ("Yes" in step S5), the control section 22 stops the motor 14 (step S8) because a taking-out force required to take out the card 2 becomes large due to the resisting operation and, as a result, a user cannot take out the card 2 during the predetermined time period and the user may give up taking-out of the card 2. When the motor 14 is stopped, the drive roller 8 is stopped and the frictional resistance applied to the card 2 by the drive roller 8 for disturbing the taking-out of the card 2 is reduced. Further, when the motor 14 is stopped in the step "S8", the flow is returned to the step "S1" and the control section 22 judges whether the taking-out operation of the card 2 is started again or not. In accordance with an embodiment of the present invention, the predetermined time period in the step "S5" is designed to be a time period in which the rear end side of the card 2 is not detected by the card sensor 15 in the step "S3" and, for example, the predetermined time period is 0.35 second.

The pre-head 19 in this embodiment is a taking-out detection mechanism for detecting taking-out of a card 2 from the taking-out ready state. Further, the drive roller 8 in this embodiment is a feed roller which feeds a card 2 in a direction ejecting the card 2 from an inside of the card reader 1 until the taking-out ready state is set. Further, in this embodiment, a resistance applying mechanism which is abutted with a card 2 taken out from the card reader 1 to apply a frictional resistance to the card 2 so as to disturb taking out of the card 2 is structured of the drive roller 8, the motor 14, the power transmission mechanism connecting the motor 14 with the drive roller 8, and the like.

Further, in this embodiment, the step "S1" is a taking-out start detection step which detects whether taking-out of a card 2 by a user in a taking-out ready state is started or not. The step "S2" is a resistance apply start step in which the resistance applying mechanism starts to apply a frictional resistance to the card 2 when it is detected that taking-out of the card 2 is started in the step "S1" which is the taking-out start detection step. In the step "S2", the drive roller 8 which is a feed roller starts to rotate in a direction taking the card 2 into the card reader 1. The step "S3" is a taking-in detection step which detects whether the card 2 is taken into the card reader 1 after the step "S2" which is the resistance apply start step. The step "S4" is a card ejection step in which, when the card 2 is detected to be taken into the card reader in the step "S3" which is the taking-in detection step, the drive roller 8 is rotated in an ejecting direction of the card 2 to perform an ejecting operation of the card 2 until a taking-out ready state. The step "S8" is a resistance reduction step in which the frictional resistance to the card 2 by the drive roller 8 is reduced in a case that the card 2 is not taken out from the card reader 1 within a predetermined time period after the step "S2" which is the resistance apply start step.

Principal Effects in this Embodiment

As described above, in this embodiment, when start of taking-out of a card 2 from its taking-out ready state is detected by the pre-head 19, the drive roller 8 is rotated in a clockwise direction to apply a frictional resistance to the card 2 so as to disturb the taking-out of the card 2. Therefore, in this embodiment, the taking-out speed of the card 2 is made non-uniform by the frictional resistance applied by the drive roller 8 at the time of taking-out of the card 2 by a user. Accordingly, in this embodiment, even when a skimming magnetic head is attached to a front side of the card insertion-and-ejection part 4 or the like, significant magnetic data are prevented from being acquired by the skimming magnetic head at the time of taking-out of the card 2 by a user. As a result, skimming at the time of taking-out of the card 2 is prevented.

In this embodiment, the drive roller 8 is rotated in a clockwise direction to apply a frictional resistance to a card 2 so as to disturb taking-out of the card 2. Therefore, a frictional resistance is applied to a card 2 so as to disturb taking-out of the card 2 by utilizing the drive roller 8 for feeding the card 2. In other words, another mechanism for applying a frictional resistance to a card 2 so as to disturb taking-out of the card 2 is not required to provide separately and the frictional resistance is applied to the card 2 so as to disturb taking-out of the card 2 only by modifying the control method for the card reader 1. Accordingly, in this embodiment, the structure of the card reader 1 is simplified. Further, in this embodiment, it is detected whether taking-out of a card 2 by a user is started or not by the pre-head 19 for detecting magnetic data recorded on a card 2 which is inserted from the card insertion-and-ejection port 3. Therefore, in comparison with a case that another mechanism is separately provided for detecting whether taking-out of a card 2 is started or not, the structure of the card reader 1 is simplified.

In this embodiment, in a case that a card 2 is not taken out from the card reader 1 within a predetermined time period after application of a frictional resistance to the card 2 is started so as to disturb taking-out of the card 2, the frictional resistance applied to the card 2 by the drive roller 8 is reduced in the step "S8". Therefore, in this embodiment, when a predetermined time period is passed after application of a frictional resistance to the card 2 is started, a taking-out force required to take out the card 2 by a user is temporarily reduced. Accordingly, in this embodiment, the card 2 is easily taken out by a user. Further, since a taking-out force for the card 2 required to take out the card 2 by a user is temporarily reduced, in a case that the user takes out the card 2 with a constant force, a taking-out speed of the card 2 is easily made non-uniform at the time of taking-out of the card 2 by a user.

In this embodiment, when the rear end side of the card 2 is detected by the card sensor 15 in the step "S3", the drive roller 8 is rotated in a direction ejecting the card 2 from the card reader 1 to perform an ejecting operation of the card 2 in the step "S4". Therefore, in this embodiment, even when the drive roller 8 is rotated in a clockwise direction for applying a frictional resistance to the card 2 which is taken out, a holding allowance of the front end side of the card 2 is secured for taking out the card 2. Further, the card 2 which is going to be taken out from the card reader 1 by a user is prevented from being taken into the inside of the card reader 1.

Other Embodiments

Although the present invention has been shown and described with reference to a specific embodiment, various changes and modifications will be apparent to those skilled in the art from the teachings herein.

In the embodiment described above, the drive roller 8 applies a frictional resistance to a card 2 so as to disturb taking-out of the card 2 which is taken out from the card reader 1. However, the present invention is not limited to this embodiment. For example, a frictional resistance may be applied to a card 2 by a resistance applying mechanism, which includes an abutting member for abutting with an end face of the card 2 in a widthwise direction of the card 2 or a face (front face or rear face) of a card 2, and a moving mechanism, which moves the abutting member between an abutting position where the abutting member is capable of abutting with the card 2 and a retreated position where the abutting member is not abutted with the card 2, so as to disturb taking-out of the card 2 being taken out from the card reader 1. In this case, when start of taking-out of a card 2 in a taking-out ready state is detected by the pre-head 19, the moving mechanism moves the abutting member located at the retreated position to the abutting position.

Further, in this case, in the above-mentioned step "S8", the abutting member may be moved to the retreated position to stop application of the frictional resistance to the card 2 by the resistance applying mechanism. Alternatively, application of the frictional resistance to the card 2 by the resistance applying mechanism may be reduced by moving the abutting member so that the frictional resistance of the abutting member with the card 2 is reduced.

In the embodiment described above, it is detected by using the pre-head 19 whether taking-out of a card 2 from a taking-out ready state is started or not. However, the present invention is not limited to this embodiment. For example, it may be detected by using a sensor other than the pre-head 19 whether taking-out of a card 2 from a taking-out ready state is started or not.

In the embodiment described above, after the motor 14 is stopped in the step "S8", the flow is returned to the step "S1". However, the present invention is not limited to this embodiment. For example, another step may be provided which judges whether or not the number of times of the stop operation of the motor 14 in the step "S8" exceeds a predetermined number after the step "S8" and, when the number of times of the stop operation in the step "S8" does not exceed the predetermined number, the flow is returned to the step "S1" and, when the number of times of the stop operation in the step "S8" exceeds the predetermined number, the stopped state of the motor 14 is maintained as it is to wait taking-out of the card 2 by a user. Also in this case, significant magnetic data are prevented from being acquired by a skimming magnetic head through a predetermined number of times of resisting operations.

In the embodiment described above, the card reader 1 includes the drive rollers 8 through 10 and the pad rollers 11 through 13 in the inside of the main body part 5 and no drive roller and no pad roller are provided in the inside of the card insertion-and-ejection part 4. However, the present invention is not limited to this embodiment. For example, the card reader 1 may include a drive roller and a pad roller in the inside of the card insertion-and-ejection part 4. In this case, a frictional resistance can be applied to a card 2 by the drive roller disposed in the inside of the card insertion-and-ejection part 4 so as to disturb taking-out of the card 2 which is taken out from the card reader 1. Therefore, a frictional resistance can be applied to a card 2 over a wide range in the feeding direction of the card 2.

In the embodiment described above, the card reader 1 is a card feeding type card reader which is provided with the drive rollers 8 through 10 and the pad rollers 11 through 13. However, a card reader to which the structure of the present invention is applied may be a manual type card reader in which reading and/or recording of magnetic data are performed while a card 2 is manually moved by a user. For example, a card reader to which the structure of the present invention is applied may be a so-called dip type card reader in which reading and/or recording of magnetic data are performed when a card 2 is inserted into the card reader or, when a card 2 is taken out from the card reader. In this case, for example, a cutout part is formed in the card insertion-and-ejection part of the card reader so that a user can hold a front end side of a card 2 and a part of the front end side of the card 2 is exposed in the cutout part, which is a taking-out ready state of the card 2 in which the card 2 is capable of being taken out from the card reader 1.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card reader for use with a card, the card reader being structured to perform at least one of reading of magnetic data recorded on the card and recording of magnetic data on the card, comprising:
    a card insertion-and-ejection part which is formed with a card insertion-and-ejection port into which the card is inserted and from which the card is ejected;
    a taking-out detection mechanism for detecting taking-out of the card from a taking-out ready state, which is a state that a part of the card is protruded from the card insertion-and-ejection port to an outer side of the card reader, or that a part of the card is exposed in the card insertion-and-ejection part so that the card is capable of being taken out from the card reader; and
    a resistance applying mechanism which is structured to abut with the card taken out from the card reader to apply a frictional resistance to the card so as to disturb the taking-out of the card;
    wherein the taking-out detection mechanism comprises a sensor for detecting start of the taking-out of the card from the taking-out ready state, the sensor being a magnetic head which is disposed in the card insertion-and-ejection part;
    wherein the resistance applying mechanism applies a frictional resistance to the card so as to disturb the taking-out of the card when the start of the taking-out of the card from the taking-out ready state is detected by the magnetic head and thereby a taking-out speed of the card is made non-uniform while still allowing the card to be taken out.

2. The card reader according to claim 1, wherein
    the resistance applying mechanism comprises a feed roller configured to feed the card in a direction ejecting the card from an inside of the card reader until the taking-out ready state,
    when the start of the taking-out of the card from the taking-out ready state is detected by the magnetic head, the feed roller is rotated in a direction taking the card into the card reader so that the taking-out speed of the card is made non-uniform.

3. The card reader according to claim 1, wherein
    the resistance applying mechanism comprises:
        an abutting member configured to abut with at least one of an end face of the card in a direction perpendicular to a taking-out direction of the card and a surface of the card; and
        a moving mechanism structured to move the abutting member between an abutting position where the abutting member is capable of abutting with the card and a retreated position where the abutting member does not abut with the card;
    when the start of the taking-out of the card from the taking-out ready state is detected by magnetic head, the moving mechanism moves the abutting member located at the retreated position to the abutting position.

4. A control method for a card reader which includes a card insertion-and-ejection part formed with a card insertion-and-ejection port into which a card is inserted and from which the card is ejected and in which at least one of reading of magnetic data recorded on the card and recording of magnetic data on a card is performed, the control method comprising:

previously providing a sensor for detecting start of taking-out of the card from the taking-out ready state, the sensor being a magnetic head which is disposed in the card insertion-and-ejection part;

setting a card in a taking-out ready state in which a part of the card is protruded from the card insertion-and-ejection port to an outer side of the card reader or in which a part of the card is exposed in the card insertion-and-ejection part;

detecting the start of taking-out of the card from the taking-out ready state by the magnetic head; and when the start of taking-out of the card is detected by the sensor, applying a frictional resistance to the card by a resistance applying mechanism which is abutted with the card taken out from the card reader and applies the frictional resistance to the card so as to disturb taking-out of the card and thereby a taking-out speed of the card is made non-uniform while still allowing the card to be taken out.

5. The control method for a card reader according to claim 4, further comprising:

a taking-out start detection step in which it is detected whether the taking-out of the card from the taking-out ready state is started or not, a resistance apply start step in which the resistance applying mechanism starts to apply the frictional resistance to the card when it is detected that taking-out of the card is started in the taking-out start detection step, and a resistance reduction step in which, when the card is not taken out from the card reader within a predetermined time period after the resistance apply start step, application of the frictional resistance to the card by the resistance applying mechanism is stopped or the frictional resistance to the card by the resistance applying mechanism is reduced, wherein the taking-out start detection step is executed after the resistance reduction step.

6. The control method for a card reader according to claim 5, wherein the resistance applying mechanism comprises a feed roller configured to feed the card in a direction ejecting the card from an inside of the card reader until the taking-out ready state, and the feed roller is started to rotate in a direction taking the card into the card reader in the resistance apply start step.

7. The control method for a card reader according to claim 6, further comprising:

a taking-in detection step in which it is detected whether the card is taken into the card reader or not after the resistance apply start step, and a card ejection step in which, when it is detected that the card is taken into the card reader in the taking-in detection step, the feed roller is rotated in an ejecting direction of the card so that an ejecting operation of the card is performed until the taking-out ready state, wherein after the card ejection step, the taking-out start detection step is executed.

\* \* \* \* \*